Figure 1:
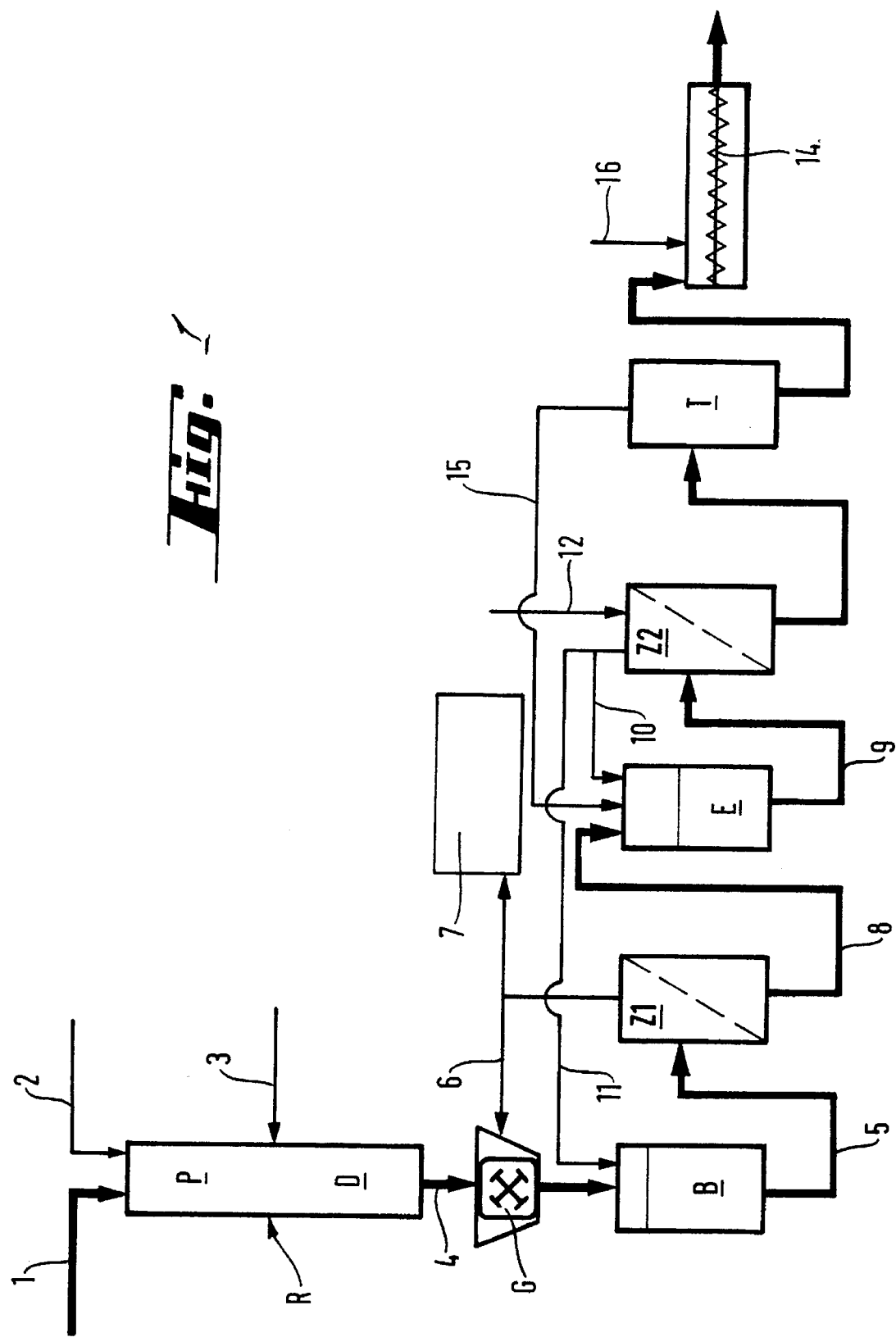

United States Patent [19]

Fleischer et al.

[11] Patent Number: 5,587,449
[45] Date of Patent: Dec. 24, 1996

[54] PROCESS FOR THE PREPARATION OF POLYACETAL COPOLYMERS

[75] Inventors: Dietrich Fleischer, Darmstadt; Michael Hoffmockel, Niedernhausen; Karl-Friedrich Mück; Günter Sextro, both of Wiesbaden, all of Germany

[73] Assignee: Hoechst Aktiengesellschaft, Germany

[21] Appl. No.: 521,998

[22] Filed: Aug. 31, 1995

[30] Foreign Application Priority Data

Sep. 5, 1994 [DE] Germany ............... 44 31 575.9

[51] Int. Cl.$^6$ ..................................... C08G 4/00
[52] U.S. Cl. ............... 528/232; 528/242; 528/248; 528/249; 528/487; 528/488; 528/492; 524/745; 524/787; 524/795
[58] Field of Search ............... 528/232, 242, 528/248, 249, 487, 488, 492; 524/745, 787, 795

[56] References Cited

U.S. PATENT DOCUMENTS

| | | | |
|---|---|---|---|
| 3,027,352 | 3/1962 | Walling et al. | 528/241 |
| 3,803,094 | 4/1974 | Ishii et al. | 528/233 |
| 4,111,912 | 9/1978 | Sextro et al. | 528/45 |
| 4,431,794 | 2/1984 | Sadlowski et al. | 528/232 |
| 5,144,005 | 9/1992 | Sextro et al. | 528/480 |

FOREIGN PATENT DOCUMENTS

| | | |
|---|---|---|
| 0080656 | 11/1982 | European Pat. Off. |
| 1495228 | 1/1972 | Germany . |
| 1720358 | 1/1976 | Germany . |
| 1161421 | 8/1977 | Germany . |
| 3018898C2 | 2/1993 | Germany . |

*Primary Examiner*—Samuel A. Acquah
*Attorney, Agent, or Firm*—Connolly & Hutz

[57] ABSTRACT

In the process for the preparation, with simultaneous end group stabilization, of polyacetal copolymers in a homogeneous phase and working up thereof, cyclic formaldehyde oligomers are copolymerized with cyclic acetals in the presence of an initiator in a polymerization reactor and immediately thereafter the initiator is deactivated by addition of basic substances, the unstable chain ends being degraded down to 0.01% to 1% in the presence of residual monomer, the product losing the majority of the residual monomer at the reactor outlet by letting down into a pelletizing device and the residual monomer which remains and the impurities dissolved in the product being removed by extraction with solvents and the product being pelletized, after drying and stabilization.

18 Claims, 1 Drawing Sheet

PROCESS FOR THE PREPARATION OF POLYACETAL COPOLYMERS

DESCRIPTION

The invention relates to a process for the preparation and end group stabilization of polyacetal copolymers in a homogeneous phase and working up thereof.

Numerous processes for the preparation of oxymethylene copolymers from formaldehyde or cyclic oligomers of formaldehyde, in particular trioxane, in the presence of initiators having a cationic action are known. Continuous polymerization of the monomers on an industrial scale is described, for example, in many publications (U.S. Pat. Nos. 3,027, 352, 3,803,094, DE-C-1 161 421, DE-C-1 495 228, DE-C-1 720 358 and DE-C-3 018 898). Polymerization reactors which are described are, inter alia: headers, extruders, roll mills or belts. A common feature of this process is a phase transition from gaseous or liquid monomers to the partly crystalline solid polymer which takes place during the polymerization. This leads to problems in removal of the heat of polymerization and crystallization liberated and as a result causes losses in conversion.

European Patent EP-B-0 080 656 describes a process for the continuous bulk polymerization of trioxane in a homogeneous liquid phase at temperatures above 135° C. Advantages which are mentioned for this process are, inter alia: easy handling of the process, lower expenditure of energy and polymers of constant product quality. German Applications P 43 27 245.2 and P 44 23 617.4 (priority 13.8.93 and 6.7.94, title: "Process for the preparation of polyacetals") describe process improvements based on a simpler process procedure as a result of a simple transition from the polymerization reactor into the deactivation reactor without a separating element. These improvements are furthermore achieved by degradation of the unstable chain ends in the presence of residual monomers, essentially trioxane and formaldehyde. It is possible here to reduce the content of unstable chain ends down to about 0.1% by weight. During working up of the product by means of a degassing unit, for example an extruder or flash chamber, however, contents of impurities, for example formaldehyde oligomers, remain in the products prepared by this polymerization process. However, this content of formaldehyde oligomersmay stand in the way of approval of the products for foodstuff uses. The formation of a deposit has also been observed during processing with the aid of injection molding. The degassing units required, furthermore, are relatively large, since the conversions which can be achieved by this polymerization process are between 60 and 80%.

The object of the invention was therefore to avoid the disadvantages mentioned.

The invention describes a process for the preparation and simultaneous end group stabilization of polyacetal copolymers in a homogeneous phase and working up thereof, in which cyclic formaldehyde oligomers, preferably trioxane, are copolymerized with cyclic acetals in the presence of an initiator in a polymerization reactor, and immediately thereafter the initiator is deactivated by addition of basic substances, the unstable chain ends being degraded in the presence of residual monomers down to 0.01% to 1%, preferably 0.02% to 0.5%, in particular 0.05% to 0.3%, and the product at the reactor outlet losing the majority of the residual monomers by letting down into a pelletizing device, preferably into a liquid-cooled die face or submersed pelletizer, each of which is operated with water, alcohols having up to three carbon atoms, preferably methanol, or mixtures thereof, and the residual monomers which remain and the impurities dissolved in the product being removed by extraction with solvents, such as water, alcohols having up to three carbon atoms, preferably methanol, or mixtures thereof, and the product being pelletized, after drying and stabilization.

The polymerization and the degradation of the unstable chain ends are preferably carried out in a tube reactor. The process is based on the German Patent Applications P 43 27 245.2 and P 44 23 617.4 described above, to which reference is made here.

The starting monomer for the copolymerization according to the invention is in general trioxane. It is decisive for successful progress of the process that the necessary degradation of chain ends follows immediately after the polymerization and is carried out in the presence of residual monomers, i.e. unreacted monomers.

Suitable comonomers for the polymerization, for example of trioxane, are cyclic acetals, such as dioxolane, diethylene glycol formal or triethylene glycol formal or butanediol formal, or linear polyacetals, for example polydioxolane or polyethylene glycol formal. The amounts of the comonomers or mixtures thereof are 0.5 to 50 percent by weight, preferably 1 to 30 percent by weight, in particular 2 to 10 percent by weight. The comonomers can be added either as a mixture with the main monomer or in the form of a reactive prepolymer. It is likewise possible to carry out sluicing of the comonomer or comonomers into the polymer melt after homopolymerization of the main monomer has taken place. The corresponding comonomer or comonomers is or are then incorporated randomly into the polymer chain by transacetalization reactions. The residence time required for the reaction mixture in the polymerization-active state is in the range from 0.1 to 10 minutes, preferably 0.3 to 5 minutes, in particular 0.5 to 2 minutes, for this reaction.

The use of bifunctional comonomers leads to partly crosslinked or branched products. Suitable initiators are proton acids, such as perchloric acid, perfluoroalkanesulfonic acids, preferably trifluoromethanesulfonic acid and anhydrides thereof, as well as hetero-polyacids or isopolyacids (EP-B-0 325 052 and EP-B-0 347 119). The initiators can be employed in amounts of 0.005 to 500 ppm. The preferred range is 0.01 to 50 ppm, in particular 0.01 to 5 ppm. Since the initiator concentration influences the molecular weight to a high degree, it is advisable to meter in the initiator in dissolved, dilute form. Solvents which can be used are in principle all compounds which do not influence the polymerization; cyclic and linear ethers, such as oligoglycol dialkyl ethers, or mixtures thereof with aliphatic or cycloaliphatic hydrocarbons, for example cyclohexane, are to be preferred; lactones, such as butyrolactone, are also suitable.

The molecular weights of the polymers can be adjusted to the desired values in a known manner by means of regulators. Possible chain transfer agents are primarily formals of monohydric alcohols, such as methylal or butylal. The alcohols themselves on which these compounds are based or water are furthermore suitable as regulators, although they cause the formation of unstable chain ends during chain transfer. The amounts usually used are 10 to 5000 ppm, and the preferred concentration is 50 to 1000 ppm. The regulators can be metered into the monomers in a known manner by admixing. In addition, however, it is also possible to meter in the substances used as regulators together with the initiator in the same solution or separately. The polymerization reactor is in general a tube reactor constructed with static mixers, which is temperature-controllable and pressure-resistant in construction. A certain temperature profile can be imposed on the reactor by establishing heating zones. Along the reactor are measurement points for pressure and temperature and metering points for monomers, initiator, deactivator and other additives. The temperatures and pressures used during the polymerization correspond to the customary values known in practice, such as are described, for example, in EP-B-0 080 656.

The dimensions, i.e. diameter and length of the corresponding static mixing elements, are to be chosen for each of the process steps stated as a function of the viscosity and residence time, whereby the pressure loss should be kept as low as possible. Information from the producers of such mixing elements is referred to here.

Thus, for example, a tube reactor should be constructed such that a narrow residence time spectrum results, which allows equilibrium conversion during which automatically few side reactions can then occur due to the minimized residence time.

A suitable device is described in German Patent Application P 43 27 246.0, to which reference is made here. It is also possible to employ other units, for example extruders, for polymerization and/or degradation of the unstable chain ends in the presence of the residual monomers.

The residence time to be observed in the polymerization zone, for example in the tube reactor, is 0.1 to 10 minutes, preferably 0.3 to 5 minutes, and in particular 0.5 to 2 minutes. The conversion to be achieved here is 60 to 80% by weight, based on the monomers employed. The molecular weights ($M_w$) of the polyacetals produced are in the range from 50 000 to 300 000 (GPC against a polystyrene standard) without the use of regulators.

Basic compounds, for example salts, such as sodium carbonate or disodium hydrogen phosphate, and aliphatic or aromatic primary, secondary or tertiary amines are used for deactivation of the initiator in the polymer melt; highly volatile tertiary amines, for example triethylamine, are preferably employed.

It is known from the German Applications P 43 27 245.2 and P 44 23 617.4 mentioned that the basic salts or amines used as deactivators furthermore are capable of degrading unstable chain ends chemically. The presence of unreacted monomers, which assume the function of a solvent and transportation mediator for improved diffusion, is of advantage here.

The concentrations of the alkaline agents vary from 0.001 to 3.0 percent by weight, based on the amount of polymer, the range from 0.02 to 2.0 percent by weight, and in particular from 0.05 to 1.0 percent by weight, being preferred.

The temperature to be applied in the second process step in the deactivation zone, in which degradation of the unstable chain ends is also carried out, is 150° C. to 250° C., preferably 170° C. to 200° C. For the rate of degradation, it has proven advantageous to remain 20° to 30° C. above the polymerization temperature. The pressure range to be maintained extends from 20 to 200 bar, preferably from 20 to 50 bar.

The addition of water or primary alcohols having up to three carbon atoms has proven advantageous in the temperature range from 150° to 175° C., in order to accelerate the degradation of the unstable chain ends.

The residence time to be established in the deactivator and stabilization zone is 0.2 to 15 minutes, preferably 1 to 15 minutes, in particular 2 to 10 minutes.

A suitable embodiment of the process according to the invention is shown in the attached figure of drawing.

In particular, the figure illustrates that a polymerization zone P and a deactivation zone D are arranged within a polymerization reactor R. The monomer input 1 and the initiator input 2 are located at the beginning of the polymerization zone P. The deactivator input 3 is located at the end of the polymerization zone P and the beginning of the aleactivation zone D. By a suitable reaction procedure in the polymerization zone P and the aleactivation zone D, a stream comprising a melt of a polymer having a content of unstable chain ends of 0.01% to 1%, preferably 0.02% to 0.5%, in particular 0.05% to 0.3%, and residual monomers and aleactivators and where appropriate solvents is obtained at the reactor outlet 4. During letting down, the melt solidifies spontaneously due to evaporation of the residual monomer. A voluminous, foamy product of low bulk density (0.2 to 0.3 g/cm$^3$) is obtained. A hot-cut unit with a liquid-cooled die face pelletizer G at this point has proven advantageous for producing a compact grain of high bulk density (0.4 to 0.6 g/cm$^3$) and for recovery of the residual monomer.

However, other units are also possible at this point, such as a device for submersed pelletizing or for pelletizing merely by evaporative cooling. To produce a compact polymer grain, it is also possible to carry out degassing in a flash chamber, an extruder or another degassing unit before the pelletizing and then to pelletize the product.

The suspension resulting form the die face pelletizer G in container B is separated into liquid and solid. If required, the product can also be subjected to wet grinding beforehand, in order to promote removal of the residual monomer, however, such beforehand grinding is not illustrated in the figure. The process goods pass via line 5 to the separating device Z1. All the apparatuses and machines customary for separation can in principle be employed, such as sieves, filters and hydrocyclones, and centrifuges have proved to be particularly suitable. The liquid is partly recycled as cooling liquid 6 to the liquid-cooled die face pelletizer G and partly fed into a work up station 7, wherein residual monomer and solvent are recovered in a known manner.

The solid with adhering liquid is fed over a line 8 to an extraction E. Suitable extraction agents are water and alcohols having up to three carbon atoms, preferably methanol, and mixtures thereof. The products prepared by the above polymerization process have a content of formaldehyde oligomers which cannot be removed from the polymer by degassing. It has been found that these formaldehyde oligomers can be extracted from the polymer under mild conditions. To accelerate the operation it is possible to grind the product further before the extraction or else directly after the liquid-cooled die face pelletizer G. To ensure rapid extraction, it is desirable to keep the particle size in the range from 50 to 2000 µm, preferably 100 to 1500 µm, in particular 200 to 1000 µm.

Suitable extraction agents are water, alcohols having up to three carbon atoms, preferably methanol, or mixtures thereof. The extraction agent is fed through line 9 into the separation device Z2 and is also suitable for use as a cooling liquid after the liquid ring granulation in container B and can, for that reason, partly be removed from the separating device Z2 through line 11 into the container B. Alternatively, the extraction agent may be removed via line 10 into the extraction E.

Suitable apparatuses for the extraction E are in principle all the arrangements customary for this, such as continuously and discontinuously operated stirred tanks, cascades of stirred tanks or flow tubes. It is also possible to use extractors.

A level of basic substances which can been added for deactivation of the active polymer chains and for degradation of the unstable chain ends at the deactivator input 3 into the polymerization reactor R is established in the extraction E via the path of the liquid adhering to the solid. It is to be ensured that the extraction proceeds in the basic range, i.e. if required, basic compounds are to be added at this point.

The temperature to be used for the extraction is in the range from 30° to 130° C., preferably from 35° C. to 100° C., in particular from 40° to 70° C. The times required for the extraction are 1 to 60, preferably 5 to 45, in particular 10 to 30 minutes. Solids contents of up to 30 percent by weight, preferably up to 20 percent by weight, can be achieved with the aid of the extraction.

After the extraction E, the solid and liquid are separated within the separation device Z2. Here, again, all the apparatuses and machines customary for separation can in principle be employed for this, such as sieves, filters and hydrocyclones, and here too centrifuges have proven suitable. It has proven particularly effective to wash the product on the centrifuge with fresh solvent 12.

Thereafter, drying is carried out by conventional processes within a dryer T and the condensate from the dryer T is recycled to the extraction E via line 15. The resulting powder can be pelletized in a known manner, with the addition of stabilizers 16 and other desirable additives in an extrusion machine 14. It is advantageous here for the polymer powder to have a high bulk density, since this ensures optimum operation of the extrusion machine 14.

EXAMPLES

The process according to the invention was carried out in a tube reactor. The reaction conditions in this were as follows:

Continuous copolymerization with a throughput of 3 kg/hour of 97 parts by weight of trioxane and 3 parts by weight of dioxolane, to which 450 ppm of methylal had been added, was initiated with 0.2 ppm of trifluoromethanesulfonic acid dissolved in diethylene glycol dimethyl ether. The polymerization at 155° C. was discontinued after 1.8 minutes with 0.3% of triethylamine and 4% of water and the unstable chain ends were degraded at 155° C. in the course of 15 minutes. A product having a content of unstable chain ends of 0.3% was thereby obtained. Porous granules having a bulk density of 0.27 g/cm$^3$ resulted by hot-cutting at the reactor outlet, with substantial evaporation of the residual monomer (Comparison Example 1). A polymer grain of 0.55 g/cm$^3$ was obtained by letting down and granulation in a water-cooled die face pelletizer under otherwise identical conditions (Example 1).

The product from Comparison Example 1 was washed with methanol in order to remove the adhering residual monomers. The product was then dried to constant weight at 80° C. in a drying cabinet under reduced pressure. The product thus obtained was ground to an average particle diameter of 400 μm and used for the following extraction experiments.

100 g of polymer powder were extracted with 600 g of solvent (see table) to which 0.1% of triethylamine had been added. The product was then dried to constant weight at 80° C. A cylindrical pressed sheet of 5 cm diameter and 2 mm thickness was produced from the product at 200° C., after addition of stabilizers. This was extracted with demineralized water at 80° C. for 30 minutes. The formaldehyde content (FC) in the extract was determined by the chromotropic acid method. In sulfuric acid solution, chromotropic acid forms a violet-colored reaction product with formaldehyde and all compounds which react to give formaldehyde under these conditions, the extinction of the reaction product at 480 nm being a measure of the formaldehyde content. The extinction is converted into a formaldehyde content by calibration and is related to the surface area of the pressed sheet.

The solvent, the extraction temperature and the extraction time were varied in the following examples.

| Example | Solvent | Time [min] | Temperature [°C.] | Extractable FC [μg/cm$^2$] |
|---------|---------|------------|-------------------|----------------------------|
| Start   | —       | —          | —                 | 51                         |
| 2       | water   | 60         | 80                | 3.3                        |
| 3       | water   | 60         | 115               | 1.0                        |
| 4       | methanol| 15         | 50                | 5.1                        |
| 5       | methanol| 30         | 50                | 4.9                        |
| 6       | methanol| 15         | 65                | 4.2                        |
| 7       | methanol| 30         | 65                | 6.9                        |
| 8       | 15% water/ 85% methanol | 15 | 65          | 3.6                        |

The extractable formaldehyde content was reduced drastically under all the extraction conditions. Example 3 gave a particularly good result. In Example 8, a quite low content of extractable formaldehyde was likewise found under particularly mild conditions. These extraction conditions were repeated in five batches in a pilot plant tank and 25 kg of product were correspondingly produced, stabilized and pelletized. In contrast to a non-extracted product which was degasseal on an extruder under a reduced pressure of 50 mbar and showed an extractable formaldehyde content of 39 μg/cm$^2$ (Comparison Example 2), no mold deposit was found with this product on production of injection moldings after 1200 shots at a cylinder temperature of 250° C. and a mold temperature of 80° C. (Example 9).

We claim:

1. In a process for the preparation and simultaneous end group stabilization of a polyacetal copolymer in a homogeneous phase, in which a cyclic formaldehyde oligomer is copolymerized with a cyclic acetal in the presence of an initiator in a polymerization reactor and immediately thereafter the initiator is deactivated by addition of a basic substance, which comprises a procedure in which the unstable chain ends are degraded down to 0.01% to 1% in the presence of residual monomer, the improvement according to which the product spontaneously solidifies due to evaporation of the residual monomer at the reactor outlet by letting down into a pelletizing device and the residual monomer which remains and the impurities dissolved in the product are removed by extraction with a solvent and the product is pelletized, after drying and stabilization.

2. The process as claimed in claim 1, wherein the pelletizing device is a liquid-cooled die face pelletizer or a submersed pelletizer.

3. The process as claimed in claim 1, wherein the polymerization and the degradation are carried out in a tube reactor.

4. The process as claimed in claim 1, wherein trioxane is employed as the cyclic formaldehyde oligomer.

5. The process as claimed in claims 1, wherein the additional chain ends are degraded down to 0.02% to 0.5%.

6. The process as claimed in claims 1, wherein the additional chain ends are degraded down to 0.05% to 0.3%.

7. The process as claimed in claim 1, wherein the product is let down at the reactor outlet into a pelletizing device which is operated with water, an alcohol having one to three carbon atoms, or a mixture thereof.

8. The process as claimed in claim 1, wherein water, an alcohol having one to three carbon atoms, or a mixture thereof is employed as the solvent in the extraction.

9. The process as claimed in claim 1, wherein the particle size during the extraction is in the range from 50 to 2000 μm.

10. The process as claimed in claim 9, wherein the particle size is in the range from 100 to 1500 μm.

11. The process as claimed in claim 9, wherein the particle size is in the range from 200 to 1000 μm.

12. The process as claimed in claim 1, wherein the residence time of the reaction mixture in the polymerization-active state is 0.1 to 10 minutes.

13. The process as claimed in claim 12, wherein the residence time is 0.5 to 2 minutes.

14. The process as claimed in claim 1, wherein the stabilization is carried out with a basic compound in an amount of 0.001 to 3.0 percent by weight during a residence time period of 0.2 to 15 minutes.

15. The process as claimed in claim 1, wherein the stabilization is carried out at a temperature of from 150° C. to 250° C.

16. The process as claimed in claim 15, wherein the temperature lies within the range of from 170° C. to 200° C.

17. The process as claimed in claim 7, wherein the alcohol is methanol.

18. The process as claimed in claim 8, wherein the alcohol is methanol.

* * * * *

UNITED STATES PATENT AND TRADEMARK OFFICE
CERTIFICATE OF CORRECTION

PATENT NO.   : 5,587,449
DATED        : December 24, 1996
INVENTOR(S)  : Dietrich Fleischer et al It is certified that error appears in the above-indentified patent and that said Letters Patent is hereby corrected as shown below:

Column 1, line 17, "headers" should read -- kneaders --; and
line 44, "oligomersmay" should read -- oligomers may --.

Column 4, line 10, "aleactivation" should read -- deactivation --; and
lines 13 and 14, "aleactivators" should read -- deactivators --.

Signed and Sealed this

Eleventh Day of March, 1997

Attest:

BRUCE LEHMAN

Attesting Officer

Commissioner of Patents and Trademarks